United States Patent [19]

Labock

[11] Patent Number: 5,326,606
[45] Date of Patent: Jul. 5, 1994

[54] BULLET PROOF PANEL
[75] Inventor: Joseph Labock, Bat Yam, Israel
[73] Assignee: Armorvision Plastics & Glass, Los Angeles, Calif.
[21] Appl. No.: 928,791
[22] Filed: Aug. 12, 1992
[51] Int. Cl.$^5$ ............................................. B32B 3/10
[52] U.S. Cl. .................................... 428/49; 428/214; 428/216; 428/220; 428/412; 428/911; 89/36.02
[58] Field of Search ................. 428/49, 412, 911, 216, 428/220, 214; 89/36.02

Primary Examiner—Alexander S. Thomas
Attorney, Agent, or Firm—Blakely, Sokoloff, Taylor, Zafman

[57] ABSTRACT

A bullet-proof panel comprising an outer panel of polycarbonate resin, a middle panel of ceramic tile and a second sheet of polycarbonate resin attached thereto, all of said layers being bonded together by a polyurethane adhesive. In the second embodiment of the present invention useful for preventing the penetration of high-velocity bullets, a third layer of polycarbonate resin is attached to the second layer of polycarbonate resin.

6 Claims, 2 Drawing Sheets

BULLET PROOF PANEL

BACKGROUND OF THE INVENTION

1. Field of the Invention

The present invention relates to armor materials, and particularly non-transparent armor materials. The present invention most particularly relates to armor materials comprising polycarbonate materials in combination with ceramic.

2. Art Background

Armor materials for non-transparent applications, such as bullet proofing vehicles and buildings and the like are well-known in the art. One common arrangement of such materials is made of ceramic materials disposed within a synthetic cloth-like material sold by DuPont Corporation under the brand name Kevlar ®. While such material is substantially protective and light weight, it is also very expensive.

One such arrangement was described in U.S. Pat. No. 4,633,756, which discloses a bullet-proof armor shield comprising a composite construction utilizing a ceramic armor plate disposed within layers of Kevlar material.

Another type of ceramic-containing bullet-proof armor plating is disclosed in U.S. Pat. No. 4,948,673, which discloses a multi-layer composite protective panel having layers of aluminum, polyurethane resin, a composite made up of aramid fibers embedded in a polyurethane resin, another layer of adhesive, and a plurality of ceramic tiles adhered to the outer surface by the adhesive.

Polycarbonate sheets are commonly used as bullet proof material for bullet proof glass and safety glass. These materials are typically used where transparency is a requirement of the material. Many different types of polycarbonate sheeting are usable as a bullet proof material. One form of polycarbonate sheet containing bullet proof material is described in Hall, U.S. Pat. No. 4,908,083, which discloses an impact-resistant laminate comprising polycarbonate up to 3 mm thick adhered to glass.

Molari, Jr., U.S. Pat. No. Re. 32,406, discloses a polycarbonate sheet coated with a polyurethane sheet.

Vincent, U.S. Pat. No. 4,387,129 is directed to a polyurethane adhesive material for making laminates, and specifically, one embodiment in which a laminate comprising a 1.5 mm thickness of polyurethane resin adhesive to bond two layers of 10 mm polycarbonate and another embodiment in which a 4 mm sheet is disclosed.

However, no prior art device has heretofore combined the light weight low cost of polycarbonate and polyurethane with protective, non-transparent ceramic material to form a relatively inexpensive, but light weight and effective bullet proof material.

SUMMARY OF THE INVENTION

The present invention comprises a multi-layer composite, non-transparent bullet-proof panel comprising, beginning on the outside, a first layer of polycarbonate sheeting, preferably at least 3 mm. in thickness. Adjacent the first polycarbonate sheet is a layer of adhesive, preferably polyurethane adhesive. The next layer is a ceramic layer comprising a plurality of ceramic modules disposed adjacent each other. In the preferred embodiment, the ceramic modules are 5 mm.×5 mm. square and 9 mm. deep. The next layer is adhesive which in turn bonds the ceramic to a second sheet of polycarbonate having a thickness preferably of about 8 mm. The layers of polyurethane adhesive are in the range of 2 to 2.4 mm. in thickness. The foregoing embodiment is useful in the protection of most typical bullets and munitions from weapons such as M-14, M-16, and AK-47 rifles.

For high-velocity bullets, a second embodiment of the present invention is provided wherein the invention as described above has an additional thin layer of polyurethane adhesive disposed on the surface of the 8 mm. polycarbonate layer and is covered by another layer of polycarbonate having a thickness of at least 6 mm.

Another aspect of the present invention is the method of making the subject invention. Each layer is applied to the preceding layer until the final assembly is made and then subjected to pressure using clamps and the like until the adhesive is dried.

In connection with the foregoing summary and the following detailed description, it is an object of the present invention to provide a bullet-proof panel which is less expensive than prior art bullet-proof panels.

It is another object of the present invention to provide an efficient and light weight bullet-proof panel with augmented capabilities of resisting attack and specifically to resist more bullets per square area without damage to the bullet-proof panel.

BRIEF DESCRIPTION OF THE DRAWINGS

The invention is herein described by way of example only, with reference to the accompanying drawings, wherein.

DETAILED DESCRIPTION OF THE INVENTION

Figure 1:
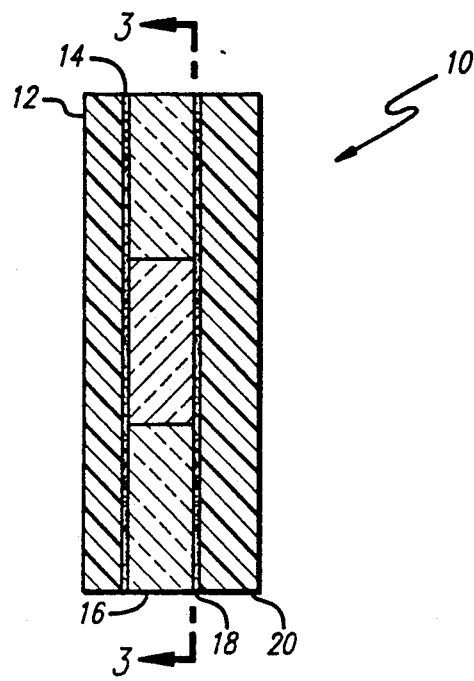
FIG. 1 illustrates a side view of a portion of a panel made in accordance with the present invention.

The bullet-resistant panel, as illustrated in FIG. 1 comprises a non-transparent bullet-resistant panel 10 made up of a plurality of layers and forming a composite. The outer layer 12 comprises a panel made of a polycarbonate sheet. The polycarbonate sheet may be obtained from Tsutsunaka of Japan under the trademark Sunloid PC ® and has the following characteristics:

| | |
|---|---|
| Specific Gravity | 1.2 |
| Rockwell Hardness | R119 |
| Tensile Strength | 650 Kgf/cm$^2$ |
| Elongation | 85% |
| Compressive Strength | 830 Kgf/cm$^2$ |
| Flexural Strength | 950 Kgf/cm$^2$ |
| Flexural Modulus | 24,000 Kgf/cm$^2$ |
| Izod Impact Strength | 80 Kgf·cm |
| Heat Deflection Temperature | 135° C. |
| Co-efficient of Linear Thermal Expansion | 7.07 cm° C. × 10$^{-5}$ |

-continued

| | |
|---|---|
| Total Light Transmittance | 87% |

Other polycarbonate materials such as General Electric Lexan ® may otherwise be used.

The second layer is a layer of polyurethane adhesive 14. The polyurethane adhesive can be any polyurethane adhesive which is commonly used and is well-known in the art. The liquid adhesive is preferably one of the commercially available cold-applied, transparent, polyurethane adhesives. As one example, the adhesive may be formulation 1908E.P supplied by Engineering Chemicals B.V., Steenbergen, Netherlands. The adhesive is preferably relatively flexible upon drying to accommodate different expansion rates of the ceramic and polycarbonate layers upon thermal changes. The polyurethane layer is preferably provided in a thickness of 2.0 to 2.4 mm.

Figure 3:
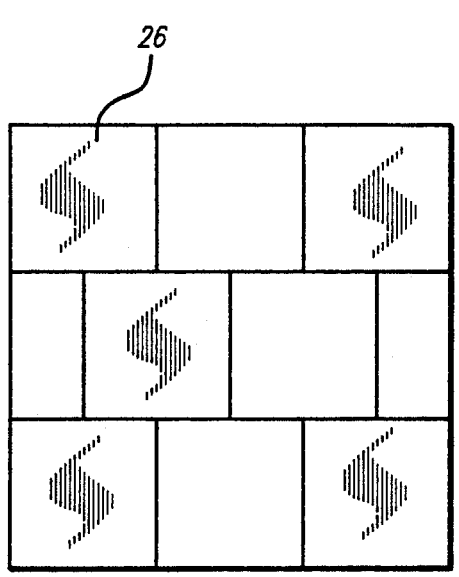
FIG. 3 illustrates a front plan view of the ceramic tile arrangement of the present invention taken through lines 3—3 of FIG. 1 made in accordance with the present invention.
Figure 4:
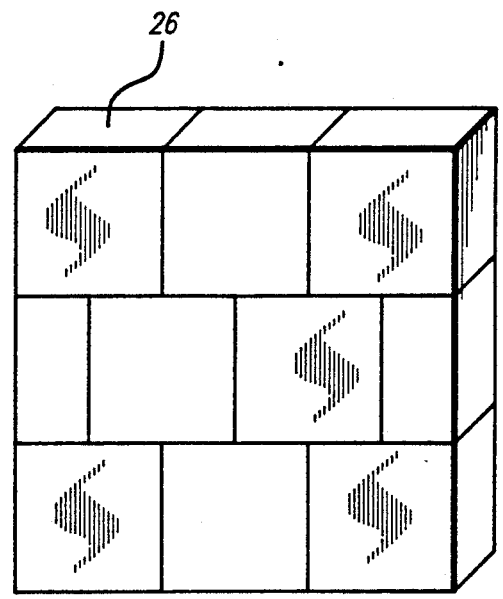
FIG. 4 represents a perspective view of the ceramic tile arrangement of FIG. 3.

The next layer 16 comprises a plurality of ceramic tiles. The ceramic tiles for use in this application as a bullet-proof armor are well-known in the art and the type of ceramic including its composition and hardness are also well-known in the art, such ceramic tiles being commercially available. Preferably the ceramic tiles are 5 cm. by 5 cm. square and approximately 9 mm. in thickness. The ceramic tiles 26, as shown in FIGS. 3 and 4, are preferably disposed in an offset arrangement to increase the mechanical strength thereof at the intersection of the edges. The ceramic tiles are commercially available ballistic ceramic material, and can be obtained from a number of sources, including from Koor Ceramics located in Nazareth, Israel.

The next layer 18 comprises another layer of polyurethane of the same material and thickness as previously described.

The last layer of the first embodiment for the present invention is another polycarbonate sheet 20 having the characteristics as described above. The thickness of this layer is approximately 8 mm.

It will be appreciated by a person of ordinary skill in the art that the present invention can be varied substantially and will still remain within the spirit and scope of the present invention. It is further recognized that many changes and modifications can be made to the materials described and selected herein without departing from the spirit and scope of the present invention.

Figure 2:
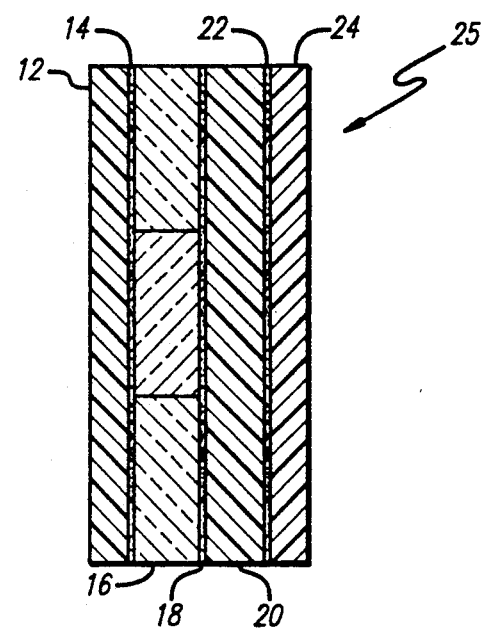
FIG. 2 illustrates a side view of a portion of an alternative embodiment of a panel made in accordance with the present invention.

The foregoing embodiment 10 shown in FIGS. 1, 3, 4 and 5 is effective in resisting bullets such as those which come from M-14, M-16 and AK-47 rifles as well as virtually all handguns. For providing a bullet-proof panel resistant to high-velocity bullets, a second embodiment 25 has an additional layer or panel as shown in FIGS. 2 and 6. This embodiment 25 has the same layers 12, 14, 16, 18 and 20 as previously described. In addition, the embodiment 25 has another layer of polyurethane adhesive 22 having a thickness preferably about 0.4 mm, which is applied to the 8 mm. polycarbonate sheet 20, and another sheet of polycarbonate 24 having a thickness of 6 mm. is bonded thereto.

With respect to the arrangement of the ceramic tiles of the present invention, the tiles are arranged abutting each other as shown in FIGS. 3 and 4. Specifically as shown, the tiles 26 are arranged in a direct contacting arrangement as shown in FIGS. 3 and 4.

Figure 5:
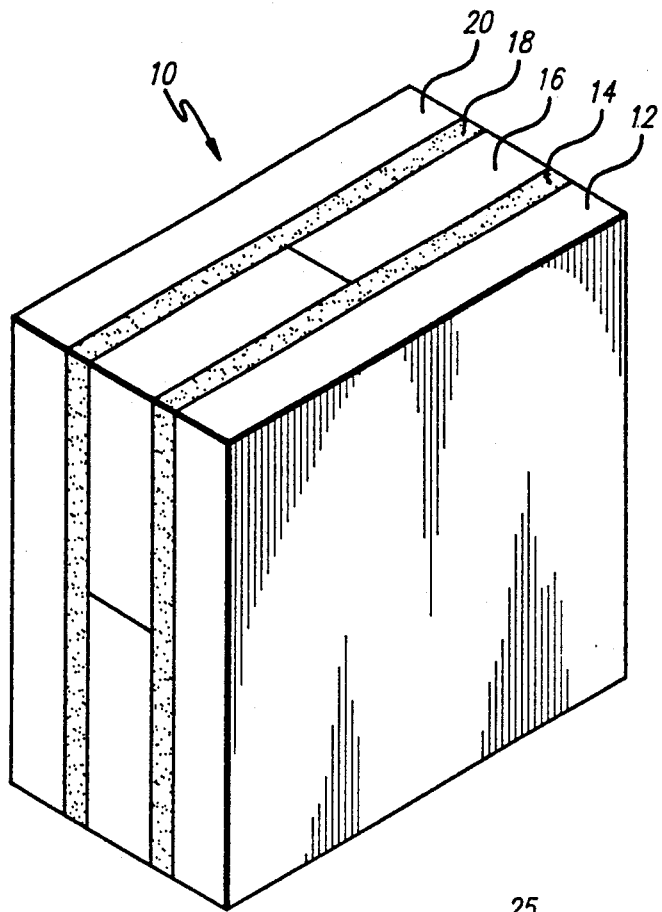
FIG. 5 is a perspective view of a portion of a panel made in accordance with the present invention.
Figure 6:
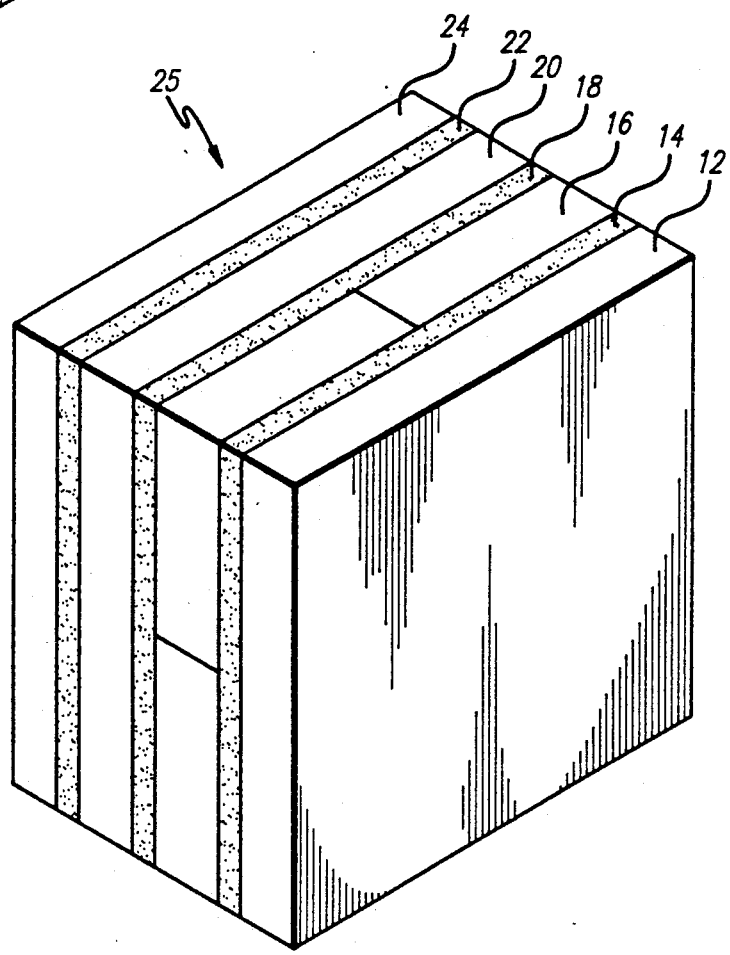
FIG. 6 is a perspective view of an alternative embodiment of a panel made in accordance with the present invention.

In the embodiment shown in FIGS. 1 and 5, the layer 12 is the outside layer and the layer 20 is the inside layer.

In the embodiment shown in FIG. 2, layer 12 is the outside layer and layer 24 is the inside layer.

In manufacturing the present invention, the 6 mm. polycarbonate layer is placed on the bottom of a work table, coated with adhesive, and then the ceramic material is applied thereto. Each successive layer as described above is then placed on the prior layer and as each layer of adhesive is applied thereto. Equipment is provided to apply pressure to retain each layer tightly against the prior layer. The composite is permitted to dry under pressure until a secure bond is obtained.

While the invention as has been described herein with respect to several preferred embodiments, it will be appreciated that many other variations, modifications and applications of the invention may be made without departing from the spirit and scope of the invention.

What is claimed is:

1. A panel effective in blocking the penetration of a bullet, said panel comprising a first outer polycarbonate sheet having a thickness of at least about 3 mm., an intermediate layer of bullet-resistant ceramic tiles bonded to said polycarbonate sheet and a second inner layer of a polycarbonate sheet bonded to said bullet resistant ceramic tiles and having a thickness of about at least 6 mm., said polycarbonate sheets being bonded to opposite sides of the layer of tiles by a polyurethane adhesive.

2. The panel according to claim 1, wherein said polyurethane adhesive has a thickness of about 2 to 2.4 mm.

3. The panel according to claim 1, wherein each of said ceramic tiles has a size of approximately 5 cm. by 5 cm. square and are approximately at least 9 mm. thick.

4. The panel according to claim 3, wherein said ceramic tiles are arranged in an abutting side-by-side arrangement and wherein adjacent rows of tiles are offset from each other.

5. The panel according to claim 1, effective for blocking the penetration of high-velocity bullets, wherein said panel further comprises a third polycarbonate sheet having a thickness of about 6 mm. and is bonded to said second polycarbonate sheet by a polyurethane adhesive.

6. The panel according to claim 5, wherein said polyurethane adhesive is about 0.4 mm in thickness.

* * * * *